United States Patent
Li et al.

(10) Patent No.: US 11,460,544 B2
(45) Date of Patent: Oct. 4, 2022

(54) TRAFFIC SIGN DETECTION FROM FILTERED BIRDVIEW PROJECTION OF LIDAR POINT CLOUDS

(71) Applicants: Dalong Li, Troy, MI (US); Andrew Chen, Troy, MI (US); Ivan Roman, White Lake, MI (US)

(72) Inventors: Dalong Li, Troy, MI (US); Andrew Chen, Troy, MI (US); Ivan Roman, White Lake, MI (US)

(73) Assignee: FCA US LLC, Auburn Hills, MI (US)

( * ) Notice: Subject to any disclaimer, the term of this patent is extended or adjusted under 35 U.S.C. 154(b) by 990 days.

(21) Appl. No.: 16/194,461

(22) Filed: Nov. 19, 2018

(65) Prior Publication Data

US 2020/0158824 A1     May 21, 2020

(51) Int. Cl.
  *G06F 11/30*     (2006.01)
  *G01S 7/48*      (2006.01)
  *G01S 13/931*    (2020.01)
  *G01S 13/42*     (2006.01)

(52) U.S. Cl.
  CPC ............ *G01S 7/4802* (2013.01); *G01S 13/42* (2013.01); *G01S 13/931* (2013.01)

(58) Field of Classification Search
  CPC .................................................. G01S 7/4802
  See application file for complete search history.

(56) References Cited

U.S. PATENT DOCUMENTS

| | | |
|---|---|---|
| 8,537,338 B1 | 9/2013 | Medasani et al. |
| 9,056,395 B1 | 6/2015 | Ferguson et al. |
| 2018/0188060 A1* | 7/2018 | Wheeler .............. G06V 10/457 |

* cited by examiner

*Primary Examiner* — Phuong Huynh
(74) *Attorney, Agent, or Firm* — Ralph E. Smith

(57) ABSTRACT

An advanced driver assistance system (ADAS) and method for a vehicle utilize a light detection and ranging (LIDAR) system configured to emit laser light pulses and capture reflected laser light pulses collectively forming three-dimensional (3D) LIDAR point cloud data and a controller configured to receive the 3D LIDAR point cloud data, convert the 3D LIDAR point cloud data to a two-dimensional (2D) birdview projection, detect a set of lines in the 2D birdview projection, filter the detected set of lines to remove lines having features that are not indicative of traffic signs to obtain a filtered set of lines, and detect one or more traffic signs using the filtered set of lines.

16 Claims, 4 Drawing Sheets

TRAFFIC SIGN DETECTION FROM FILTERED BIRDVIEW PROJECTION OF LIDAR POINT CLOUDS

FIELD

The present application generally relates to vehicle advanced driver assistance systems (ADAS) and, more particularly, to techniques for traffic sign detection from a filtered birdview projection of light detection and ranging (LIDAR) point clouds.

BACKGROUND

Some vehicle advanced driver assistance systems (ADAS) utilize light detection and ranging (LIDAR) systems to capture information. LIDAR systems emit laser light pulses and capture pulses that are reflected back by surrounding objects. By analyzing the return times and wavelengths of the reflected pulses, three-dimensional (3D) LIDAR point clouds are obtained. Each point cloud comprises a plurality of reflected pulses in a 3D (x/y/z) coordinate system). These point clouds could be used to detect objects (other vehicles, pedestrians, traffic signs, etc.). It is typically difficult, however, to distinguish between different types of objects without using extensively trained deep neural networks (DNNs). This requires a substantial amount of labeled training data (e.g., manually annotated point clouds) and also substantial processing power, which increases costs and decreases vehicle efficiency. Accordingly, while such ADAS systems work well for their intended purpose, there remains a need for improvement in the relevant art.

SUMMARY

According to one example aspect of the invention, an advanced driver assistance system (ADAS) for a vehicle is presented. In one exemplary implementation, the ADAS comprises: a light detection and ranging (LIDAR) system configured to emit laser light pulses and capture reflected laser light pulses collectively forming three-dimensional (3D) LIDAR point cloud data and a controller configured to: receive the 3D LIDAR point cloud data, convert the 3D LIDAR point cloud data to a two-dimensional (2D) birdview projection, detect a set of lines in the 2D birdview projection, filter the detected set of lines to remove lines having features that are not indicative of traffic signs to obtain a filtered set of lines, and detect one or more traffic signs using the filtered set of lines.

In some implementations, the controller is configured to detect the set of lines in the 2D birdview projection via connected component labeling where groups of connected pixels in the 2D birdview projection are identified as the set of lines.

In some implementations, the controller is configured to perform size based filtering by determining a bounding box for each line and determining a degree of occupancy indicative of how much each line occupies its respective bounding box and removing any of the set of lines having a degree of occupancy less than a threshold to obtain the filtered set of lines.

In some implementations, the controller is configured to perform velocity based filtering by detecting which of the set of lines correspond to moving objects and removing any of the set of lines corresponding to moving objects from the set of lines to obtain the filtered set of lines. In some implementations, the controller is configured to perform length based filtering by detecting which of the filtered set of lines correspond to static objects having a length greater than a traffic sign length threshold and removing any of the set of filtered lines corresponding to static objects having the length greater than the traffic sign threshold from the filtered set of lines. In some implementations, the moving objects are other vehicles and the static objects having the length greater than the traffic sign threshold are non-traffic sign static structures.

In some implementations, the controller is further configured to localize a position of the vehicle on a map based on the one or more detected traffic signs.

In some implementations, the controller does not utilize a deep neural network (DNN) and machine learning.

According to another example aspect of the invention, a method of detecting one or more traffic signs surrounding a vehicle is presented. In one exemplary implementation, the method comprises: receiving, by a controller of the vehicle and from a LIDAR system of the vehicle, 3D LIDAR point cloud data indicative of reflected laser light pulses captured by the LIDAR system after emitting of laser light pulses by the LIDAR system, converting, by the controller, the 3D LIDAR point cloud data to a 2D birdview projection, detecting, by the controller, a set of lines in the 2D birdview projection, filtering, by the controller, the detected set of lines to remove lines having features that are not indicative of traffic signs to obtain a filtered set of lines, and detecting, by the controller, one or more traffic signs using the filtered set of lines.

In some implementations, detecting the set of lines in the 2D birdview projection comprises utilizing, by the controller, connected component labeling where groups of connected pixels in the 2D birdview projection are identified as the set of lines.

In some implementations, the filtering comprises size based filtering by determining a bounding box for each line and determining a degree of occupancy indicative of how much each line occupies its respective bounding box and removing any of the set of lines having a degree of occupancy less than a threshold to obtain the filtered set of lines.

In some implementations, the filtering comprises velocity based filtering by detecting which of the set of lines correspond to moving objects and removing any of the set of lines corresponding to moving objects from the set of lines to obtain the filtered set of lines. In some implementations, the filtering comprises length based filtering by detecting which of the filtered set of lines correspond to static objects having a length greater than a traffic sign length threshold and removing any of the set of filtered lines corresponding to static objects having the length greater than the traffic sign threshold from the filtered set of lines. In some implementations, the moving objects are other vehicles and the static objects having the length greater than the traffic sign threshold are non-traffic sign static structures.

In some implementations, the method further comprises localizing, by the controller, a position of the vehicle on a map based on the one or more detected traffic signs.

In some implementations, the controller does not utilize a DNN and machine learning.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, there exists a need for improvement in automated driver assistance (ADAS) systems that utilize light detection and ranging (LIDAR) for object detection. It will be appreciated that the term "ADAS" as used herein includes driver assistance systems (lane keeping, adaptive cruise control, etc.) as well as partially and fully autonomous driving systems. A conventional ADAS for object detection utilizes a deep neural network (DNN) trained by machine learning with annotated (e.g., human labeled) training data. This requires a substantial amount of resources, both from a processing standpoint and a labeled training data standpoint, which increases costs. Accordingly, simplified techniques for traffic sign detection are presented. These techniques involve converting three-dimensional (3D) point cloud data to a two-dimensional (2D) birdview projection. The term "birdview" as used herein refers to a bird's-eye elevated view of the area surrounding a vehicle (e.g., with a perspective as though the observer were a bird). Line detection is then performed on this 2D birdview projection, and the detected lines are then filtered to remove any lines having features that are not indicative of traffic signs and the filtered lines are used to detect (i.e., are indicative of) one or more traffic signs.

Figure 1:
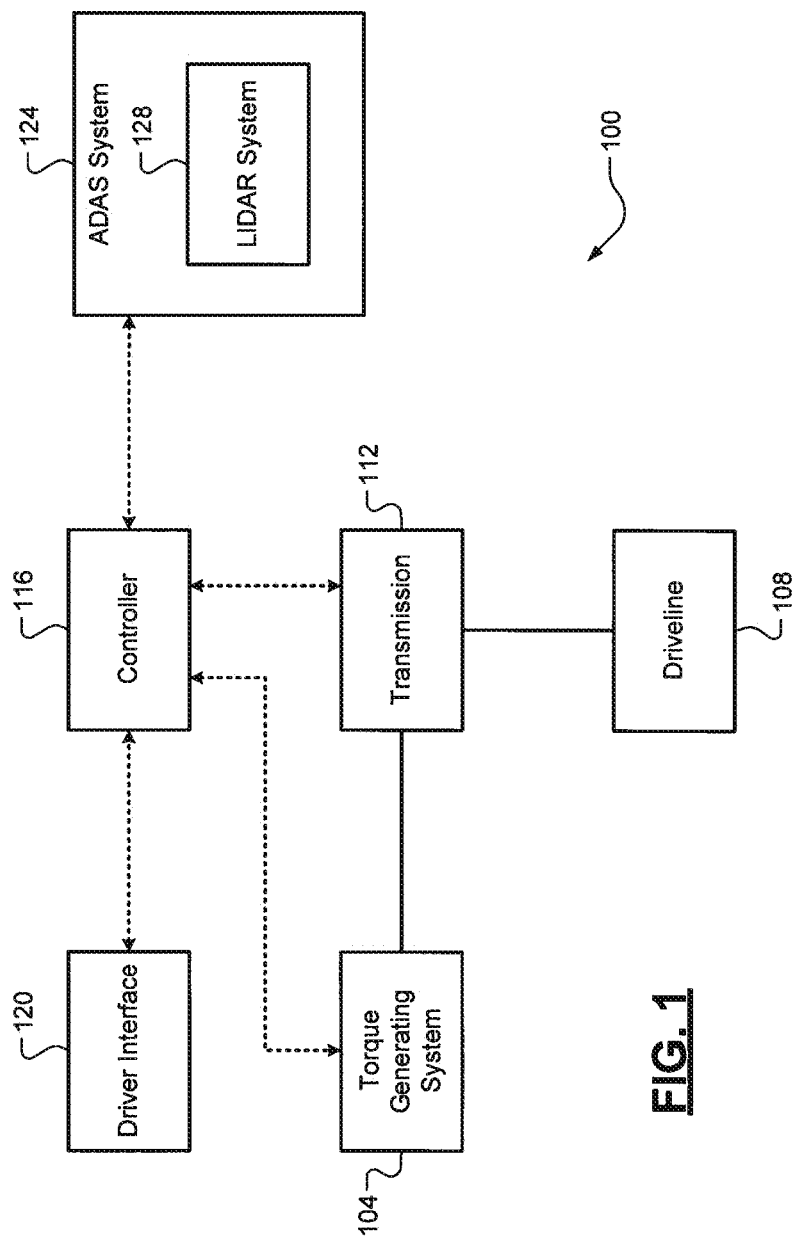
FIG. 1 is a functional block diagram of an example vehicle having an advanced driver assistance system (ADAS) with a light detection and ranging (LIDAR) system according to some implementations of the present disclosure.

Referring now to FIG. 1, a functional block diagram of an example vehicle 100 is illustrated. The vehicle 100 comprises a torque generating system 104 (an engine, an electric motor, combinations thereof, etc.) that generates drive torque that is transferred to a driveline 108 via a transmission 112. A controller 116 controls operation of the torque generating system 104, such as to generate a desired drive torque based on a driver input via a driver interface 120 (a touch display, an accelerator pedal, combinations thereof, etc.). The vehicle 100 further comprises an ADAS 124 having a LIDAR system 128. While the ADAS 124 is illustrated as being separate from the controller 116, it will be appreciated that the ADAS 124 could be incorporated as part of the controller 116, or the ADAS 124 could have its own separate controller. The LIDAR system 128 emits laser light pulses and captures reflected laser light pulses (from other vehicles, structures, traffic signs, etc.) that collectively form captured 3D LIDAR point cloud data.

Figure 2:
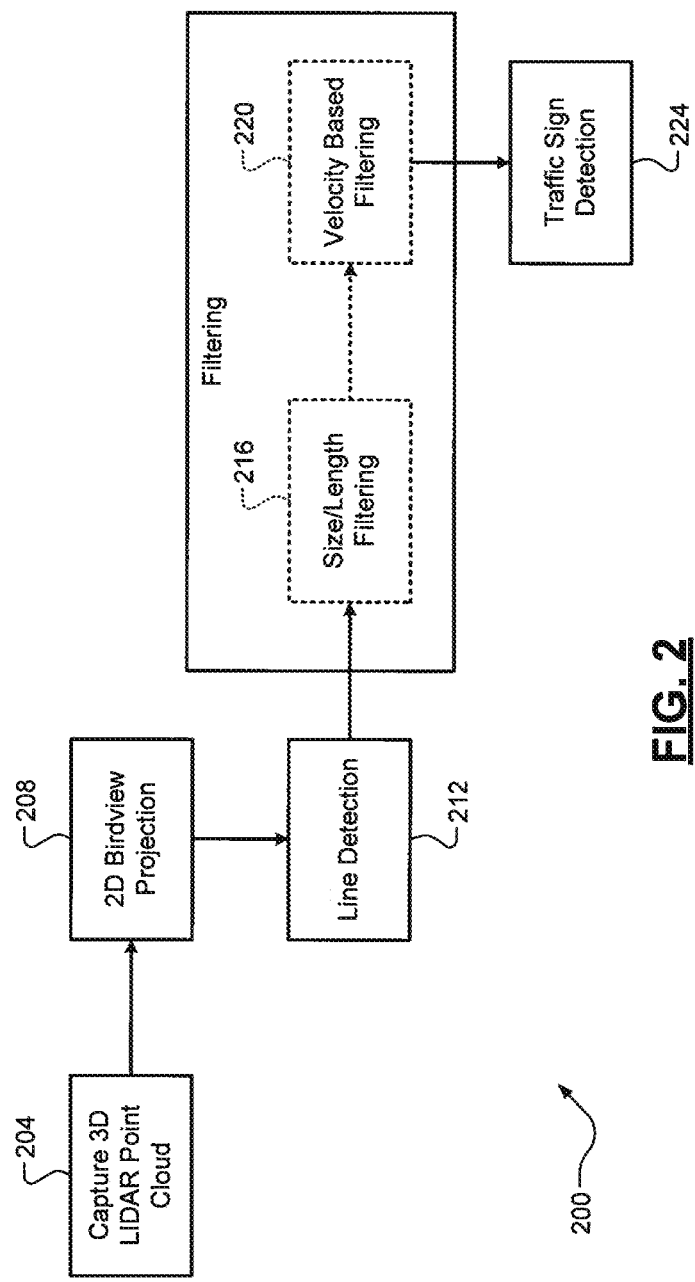
FIG. 2 is a functional block diagram of an example traffic sign detection architecture according to some implementations of the present disclosure.

Referring now to FIG. 2, a functional block diagram of an example traffic sign detection architecture 200 is illustrated. It will be appreciated that this architecture 200 could be implemented by the ADAS 124 or the controller 116. At 204, the 3D LIDAR point cloud data is captured using the LIDAR system 128. This could include, for example, analyzing return times and wavelengths of the reflected laser light pulses. At 208, the 3D LIDAR point cloud data is converted to a 2D birdview image. This could include, for example only, projecting the 3D LIDAR point cloud data onto a ground plane. In other words, the x-y coordinates could be sliced or divided into vertical bins. It will be appreciated, however, that any suitable 3D point cloud to 2D birdview or perspective projection conversion technique could be utilized. At 212, line detection is performed on the 2D birdview image to detect a set of lines. Each point/line also has features associated therewith (velocity, height, etc.). The velocity could be measured, for example, using other sensors (e.g., radar).

Some of these lines may be indicative of traffic signs, whereas others may be indicative of other objects (other vehicles, structures, etc.). Traffic signs are unique in that they are relatively tall and narrow and are also static (i.e., non-moving). Filtering is therefore performed to remove any lines having features that are not indicative of traffic signs. At 216, size and/or length based filtering on the set of lines could be performed. At 220, velocity based filtering on the set of lines could performed. After both of these filtering operations, a filtered set of lines is obtained. It will be appreciated that the size based filtering could comprise bounding box occupancy based filtering, which is discussed in greater detail below. Lastly, at 224, one or more traffic signs are detected using the filtered set of lines. This process is further explained below and illustrated in FIGS. 3A-3B. One example use for the detected traffic sign(s) is the localization of a position of the vehicle 100 on a map because traffic signs are landmarks. It will be appreciated that the detected traffic sign(s) could be used for any other suitable features, such as collision avoidance.

Figure 3B:
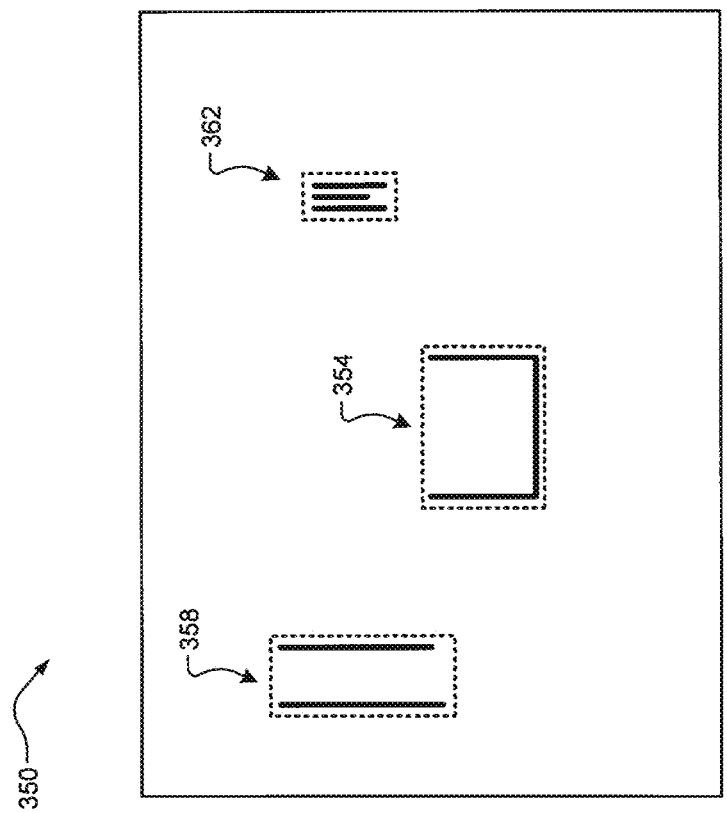
FIGS. 3A-3B depict example vehicle view from which three-dimensional (3D) LIDAR point cloud data is obtained and a corresponding example set of lines detected from a two-dimensional (2D) birdview projection according to some implementations of the present disclosure.
Figure 3A:
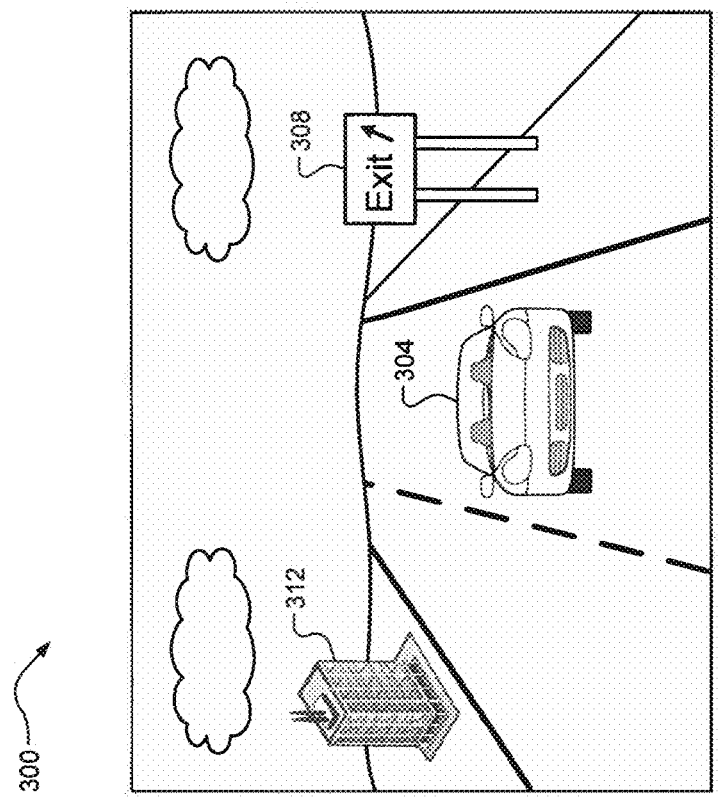

Referring now to FIG. 3A, an example view 300 from vehicle 100 for which 3D LIDAR point cloud data is obtained is illustrated. As shown, there is another vehicle 304 nearby, along with a traffic sign 308 and a building or structure 312. The LIDAR system 128 emits laser light pulses and captures reflected laser light pulses. These reflected laser light pulses are reflected off of other objects, such as vehicle 304, traffic sign 308, and building/structure 312. Other objects could also reflect the laser light pulses, such as a ground surface. The reflected laser light pulses captured by the LIDAR system 128 collectively form 3D LIDAR point cloud data, including a plurality of reflected laser light pulses in a 3D (x/y/z) coordinate space. Referring now to FIG. 3B, an example set of lines 354, 358, 362 detected from a 2D birdview projection of the 3D LIDAR point cloud data is illustrated. It will be appreciated that 354, 358, and 362 could refer to single lines of groups of related lines.

As shown, lines 354 correspond to vehicle 304, lines 358 correspond to the building/structure 312, and lines 362 correspond to the traffic sign 308. As discussed above, filtering is performed to remove any lines having features that are not indicative of traffic signs. One example filter operation is a bounding box occupancy or size filter. As illustrated in FIG. 3B, bounding boxes may be determined for each set of lines 354, 358, 362. A degree of occupancy of each bounding box is then calculated. This degree of occupancy refers to a ratio of a total number of line pixels to a total size of the bounding box. Because traffic signs are relatively small/compact, they will typically have a high degree of occupancy. Other objects, such as vehicle 304 (e.g., having an outlined U-shaped line), on the other hand, will typically have a relatively low degree of occupancy. Some objects, such as structure/building 308 may or may not have a particularly high degree of occupancy. Thus, multiple different filter operations are performed to improve traffic sign detection robustness.

Other types of filtering include velocity based and length based filtering. As previously discussed, the points/lines have features (e.g., velocity) associated therewith. This allows for the determination of whether the objects represented by the lines are moving or static (non-moving). This is important because traffic signs are landmarks and thus do not move. Lines 354 will have a velocity feature, thereby allowing them to be removed from consideration as a traffic sign. Lines 358 will not have a velocity feature, and thus they are not removable via velocity based filtering. Length based filtering is used to discern between different heights or lengths of objects. Traffic signs will have heights in a relatively small/compact range, whereas other objects, such as building/structure 312 will have heights that exceed some height or length threshold. This allows for building/structure 312 to be removed from consideration as a traffic sign. This results in only lines 362 being detected as a traffic sign (i.e., traffic sign 308).

Figure 4:
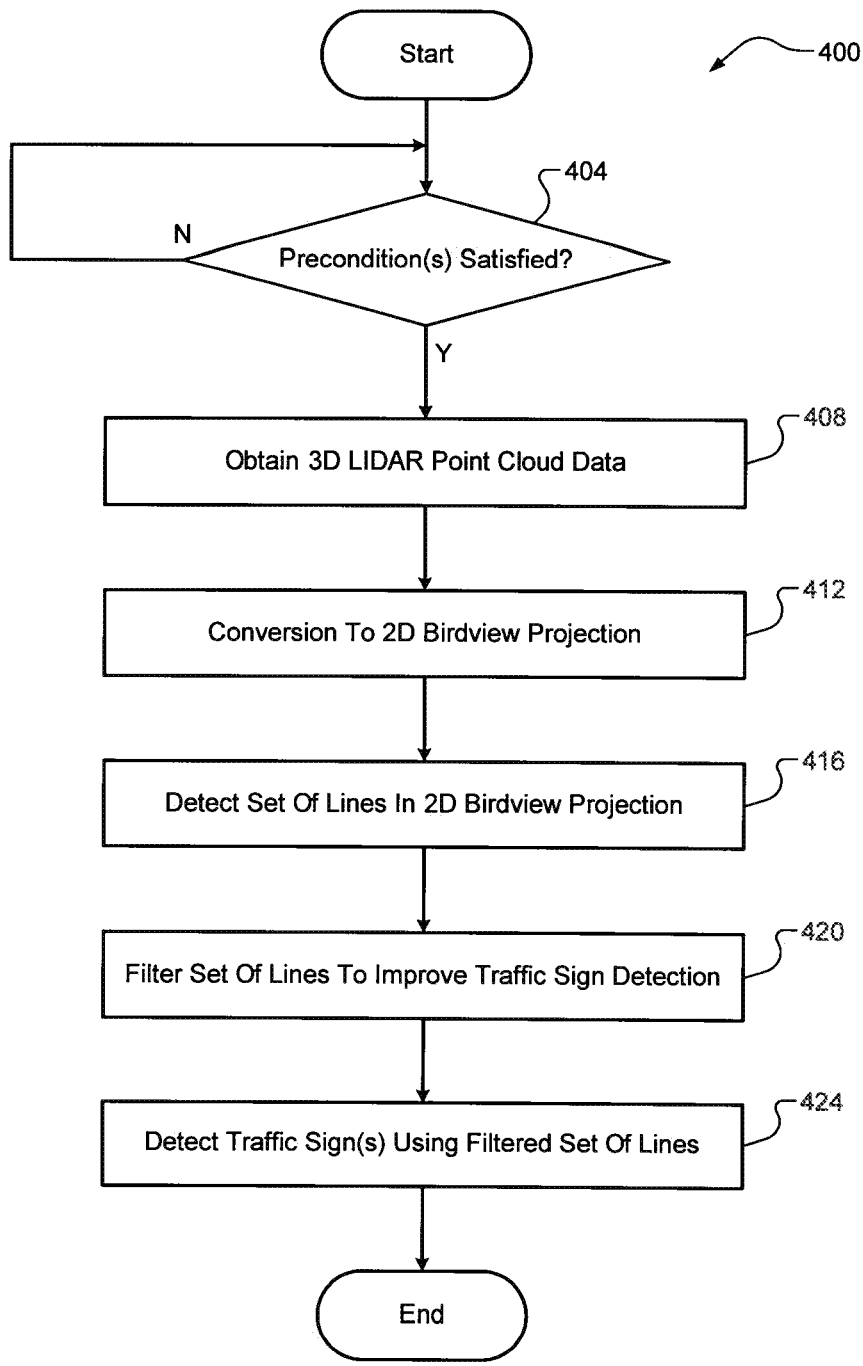
FIG. 4 is a flow diagram of an example method of traffic sign detection according to some implementations of the present disclosure.

Referring now to FIG. 4, a flow diagram of a traffic sign detection method 400 is illustrated. At 404, the controller 116 optionally determines whether a set of one or more preconditions are satisfied. These could include, for example only, the vehicle 100 being operated (e.g., the torque generating system 104 being activated) and no malfunctions being present. At 408, the controller 116 obtains the 3D LIDAR point cloud data using the LIDAR system 128. At 412, the controller 116 converts the 3D LIDAR point cloud data to a 2D birdview projection (e.g., by projection onto a ground plane). At 416, the controller 116 detects a set of one or more lines in the 2D birdview projection. At 420, the controller 116 filters the set of lines to remove any lines having features that are not indicative of traffic signs to obtain a filtered set of lines. At 424, the filtered set of lines is used to detect one or more traffic signs. The method 400 then ends. It will be appreciated that the method 400 could include additional steps after 428, such as using the detected traffic sign(s), e.g., to localize a position of the vehicle 100 on a map, such as a high definition (HD) global positioning system (GPS) map being displayed to the driver via the driver interface 120. Localization of the vehicle position could be helpful because GPS and other similar systems could be slow and/or inaccurate.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An advanced driver assistance system (ADAS) for a vehicle, the ADAS comprising:
    a light detection and ranging (LIDAR) system configured to emit laser light pulses and capture reflected laser light pulses collectively forming three-dimensional (3D) LIDAR point cloud data; and
    a controller configured to:
        receive the 3D LIDAR point cloud data,
        convert the 3D LIDAR point cloud data to a two-dimensional (2D) birdview projection,
        detect a set of lines in the 2D birdview projection,
        filter the detected set of lines to remove lines having features that are not indicative of traffic signs to obtain a filtered set of lines, and
        detect one or more traffic signs using the filtered set of lines.

2. The ADAS of claim 1, wherein the controller is configured to detect the set of lines in the 2D birdview projection via connected component labeling where groups of connected pixels in the 2D birdview projection are identified as the set of lines.

3. The ADAS of claim 1, wherein the controller is configured to perform size based filtering by determining a bounding box for each line and determining a degree of occupancy indicative of how much each line occupies its respective bounding box and removing any of the set of lines having a degree of occupancy less than a threshold to obtain the filtered set of lines.

4. The ADAS of claim 1, wherein the controller is configured to perform velocity based filtering by detecting which of the set of lines correspond to moving objects and removing any of the set of lines corresponding to moving objects from the set of lines to obtain the filtered set of lines.

5. The ADAS of claim 4, wherein the controller is configured to perform length based filtering by detecting which of the filtered set of lines correspond to static objects having a length greater than a traffic sign length threshold and removing any of the set of filtered lines corresponding to static objects having the length greater than the traffic sign threshold from the filtered set of lines.

6. The ADAS of claim 5, wherein the moving objects are other vehicles and the static objects having the length greater than the traffic sign threshold are non-traffic sign static structures.

7. The ADAS of claim 1, wherein the controller is further configured to localize a position of the vehicle on a map based on the one or more detected traffic signs.

8. The ADAS of claim 1, wherein the controller does not utilize a deep neural network (DNN) and machine learning.

9. A method of detecting one or more traffic signs surrounding a vehicle, the method comprising:
    receiving, by a controller of the vehicle and from a light detection and ranging (LIDAR) system of the vehicle, three-dimensional (3D) LIDAR point cloud data indicative of reflected laser light pulses captured by the LIDAR system after emitting of laser light pulses by the LIDAR system;
    converting, by the controller, the 3D LIDAR point cloud data to a two-dimensional (2D) birdview projection;

detecting, by the controller, a set of lines in the 2D birdview projection;

filtering, by the controller, the detected set of lines to remove lines having features that are not indicative of traffic signs to obtain a filtered set of lines; and detecting, by the controller, one or more traffic signs using the filtered set of lines.

10. The method of claim 9, wherein detecting the set of lines in the 2D birdview projection comprises utilizing, by the controller, connected component labeling where groups of connected pixels in the 2D birdview projection are identified as the set of lines.

11. The method of claim 9, wherein the filtering comprises size based filtering by determining a bounding box for each line and determining a degree of occupancy indicative of how much each line occupies its respective bounding box and removing any of the set of lines having a degree of occupancy less than a threshold to obtain the filtered set of lines.

12. The method of claim 9, wherein the filtering comprises velocity based filtering by detecting which of the set of lines correspond to moving objects and removing any of the set of lines corresponding to moving objects from the set of lines to obtain the filtered set of lines.

13. The method of claim 12, wherein the filtering comprises length based filtering by detecting which of the filtered set of lines correspond to static objects having a length greater than a traffic sign length threshold and removing any of the set of filtered lines corresponding to static objects having the length greater than the traffic sign threshold from the filtered set of lines.

14. The method of claim 13, wherein the moving objects are other vehicles and the static objects having the length greater than the traffic sign threshold are non-traffic sign static structures.

15. The method of claim 9, further comprising localizing, by the controller, a position of the vehicle on a map based on the one or more detected traffic signs.

16. The method of claim 9, wherein the controller does not utilize a deep neural network (DNN) and machine learning.

* * * * *